(12) United States Patent
Kasutani (10) Patent No.: US 7,697,753 B2
(45) Date of Patent: Apr. 13, 2010

(54) DEVICE FOR CREATING IMAGE FEATURE FROM IMAGE HAVING ANY SHAPE

(75) Inventor: Eiji Kasutani, Tokyo (JP)

(73) Assignee: NEC Corporation, Tokyo (JP)

( * ) Notice: Subject to any disclaimer, the term of this patent is extended or adjusted under 35 U.S.C. 154(b) by 988 days.

(21) Appl. No.: 10/467,371

(22) PCT Filed: Feb. 19, 2002

(86) PCT No.: PCT/JP02/01396

§ 371 (c)(1),
(2), (4) Date: Aug. 6, 2003

(87) PCT Pub. No.: WO02/067197

PCT Pub. Date: Aug. 29, 2002

(65) Prior Publication Data

US 2004/0061842 A1      Apr. 1, 2004

(30) Foreign Application Priority Data

Feb. 19, 2001    (JP) .............................. 2001-042132

(51) Int. Cl.
*G06K 9/00* (2006.01)
(52) U.S. Cl. ....................... 382/162; 382/167
(58) Field of Classification Search ................ 382/162, 382/163, 164, 165, 166, 167
See application file for complete search history.

(56) References Cited

U.S. PATENT DOCUMENTS

| | | | |
|---|---|---|---|
| 6,078,694 A * | 6/2000 | Takahashi et al. | 382/238 |
| 6,208,753 B1 * | 3/2001 | Braudaway et al. | 382/162 |
| 6,266,453 B1 * | 7/2001 | Hibbard et al. | 382/294 |
| 6,272,254 B1 | 8/2001 | Kaup | |
| 6,493,387 B1 * | 12/2002 | Shin et al. | 375/240.1 |
| 6,603,885 B1 * | 8/2003 | Enomoto | 382/263 |
| 6,625,212 B1 * | 9/2003 | Chen et al. | 375/240.08 |

(Continued)

FOREIGN PATENT DOCUMENTS

DE        19648963        4/1998

(Continued)

OTHER PUBLICATIONS

"All of MPEG-4" published by Kogyo chosakai pp. 76-88 (1998).

(Continued)

*Primary Examiner*—Brian Q Le
(74) *Attorney, Agent, or Firm*—Scully, Scott, Murphy & Presser, P.C.

(57) ABSTRACT

An apparatus is disclosed for generating image feature data from an image having an arbitrary shape for use in image search. The apparatus includes rectangular area generating unit (2); rectangular image generating unit (3); padded-pixel value selecting unit (5); and image feature data generating unit (4). First, rectangular image generating unit (2) draws a rectangular area around input image (1) such that input image (1) is included therein. Rectangular image generating unit (3) pads a pixel value in an area of the rectangular area generated by rectangular area generating unit (2) which does not include pixels associated with input image (1) to generate a rectangular image. Image feature data generating unit (4) generates feature data from the image generated by rectangular image generating unit (3).

18 Claims, 7 Drawing Sheets

U.S. PATENT DOCUMENTS

| | | | |
|---|---|---|---|
| 6,683,992 B2 * | 1/2004 | Takahashi et al. | 382/243 |
| 6,801,665 B1 * | 10/2004 | Atsumi et al. | 382/239 |
| 7,057,653 B1 * | 6/2006 | Kubo | 348/273 |
| 2002/0094122 A1 * | 7/2002 | Matsukubo et al. | 382/165 |
| 2002/0136453 A1 * | 9/2002 | Aggarwal et al. | 382/166 |

FOREIGN PATENT DOCUMENTS

| | | |
|---|---|---|
| EP | 0 899 686 | 3/1999 |
| EP | 0 947 937 | 10/1999 |
| EP | 1 018 688 | 7/2000 |
| JP | 08-241417 | 9/1996 |
| JP | 08-249468 | 9/1996 |
| JP | 11-067634 | 3/1999 |
| JP | 11-316819 | 11/1999 |
| JP | 2000-259832 | 9/2000 |
| JP | 2001-016470 | 1/2001 |

OTHER PUBLICATIONS

International Preliminary Examination Report, dated Feb. 19, 2002.

Supplemental European Search Report Dated Oct. 26, 2009.

Santhana Krishnamachari, et al., "Multimedia Content Filtering, Browsing, and Matching Using MPEG-7 Compact Color Descriptors", Visual 2000, V1929, Philips Research, Briarcliff Manor, NY; C&C Media Research Laboratories, NEC Corp., Japan, pp. 200-211.

Kyoji Hirata, et al., "On Image Segmentation for Object-based Image Retrieval", 2002 IEEE, Multimedia Research Laboratories, NEC Corp., Japan, pp. 1031-1034.

* cited by examiner

DEVICE FOR CREATING IMAGE FEATURE FROM IMAGE HAVING ANY SHAPE

TECHNICAL FIELD

The present invention relates to an apparatus for generating feature data from an image having an arbitrary shape for use in an image search.

BACKGROUND ART

Conventionally, image data has been represented by image feature data indicative of its feature, and this image feature data has been used to determine similarities in respective images. Also, apparatuses and computer programs have been developed for retrieving similar images (for example, from stored images). A method typically employed in such conventional image search techniques uses feature data which represents colors included in an image and a structure possessed by the image (hereinafter referred to as color structure feature data) to retrieve similar images from similarities in the features.

Exemplary prior art techniques for representing a chromatic feature and a structural feature possessed by an image are disclosed in JP-A-11-316819 and JP-A-2000-259832.

JP-A-11-316819 proposes a method which divides an image into a plurality of blocks, calculates a histogram for colors included in each block, defines a collection of values of the color histogram in each block as color distribution feature data, and uses the color distribution feature data to determinate similarities and searches. In this color distribution feature data, since the color histogram is indicated on a block-by-block basis, the chromatic feature and structural feature possessed by the image can be reflected to the determination of similarities.

JP-A-2000-259832 discloses an image search technique which utilizes frequency distribution feature data, which represents a color structure possessed by an image in the frequency domain, as image feature data. The frequency distribution feature data of an image refers to image feature data which represents the energy in each band that is found by dividing a frequency distribution of the spectrum of colors (average color) in the image into a plurality of bands, and analyzing each of the bands in terms of frequency.

Figure 1:
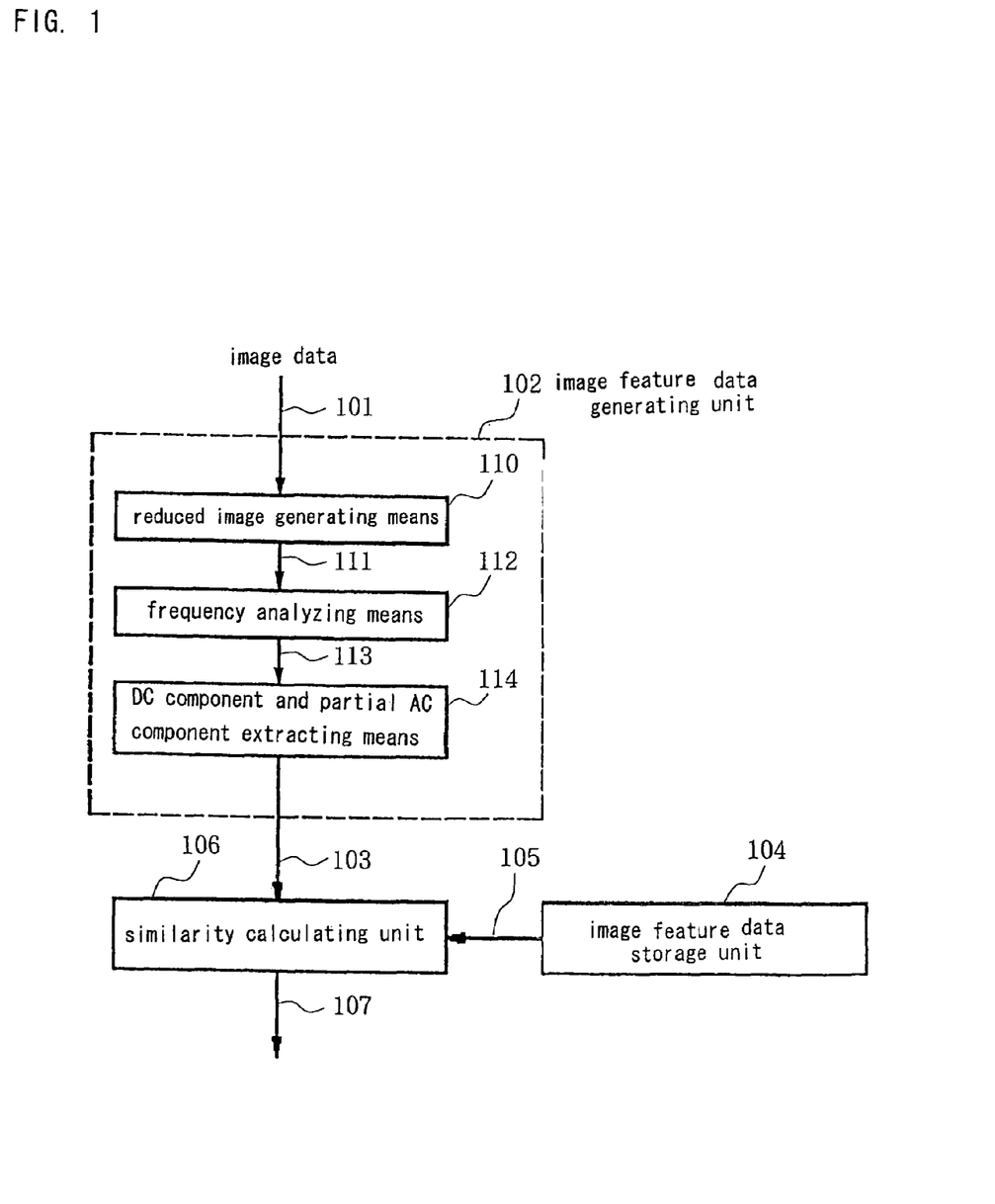
FIG. 1 is a block diagram illustrating the configuration of a main portion of a conventional image search system.

FIG. 1 is a block diagram illustrating the configuration of a main portion of an image search system described in JP-A-2000-259832. This image search system comprises image feature data generating unit 102 for generating frequency distribution feature data 103 from input image data 101; frequency distribution feature data storage unit 104 for previously storing therein frequency distribution feature data of images to be searched; and similarity calculating unit 106 for calculating similarity 107 using frequency distribution feature data 104 of the input image and feature data 105 stored in frequency distribution feature data storage unit 104.

Image feature data generating unit 102 comprises reduced image generating means 110 for generating reduced image 111 from image data 101; frequency analyzing means 112 for performing a frequency analysis on generated reduced image 111; and DC component and partial AC component extracting means 114 for extracting a DC component and part of AC components from among orthogonal conversion coefficients 113 derived from frequency analyzing means 112 as frequency distribution feature data 103.

The foregoing image search system fails to extract color distribution feature data and frequency distribution feature data from an image having an arbitrary shape-because these feature data are extracted on the assumption that the image is rectangular. For this reason, this system cannot conduct an image search in an image database which mixedly stores images having various shapes.

DISCLOSURE OF THE INVENTION

It is an object of the present invention to provide an apparatus which solves the disadvantages of the prior art techniques and generates image feature data for implementing an image search from images having arbitrary shapes (images of interest).

According to a first aspect of the present invention, an image feature data generating apparatus has rectangular area generating means, rectangular image generating means, and image feature data generating means. The rectangular area generating means generates a rectangular area which contains the image of interest for which the image feature data is generated. The rectangular image generating means pads a pixel value into an area which does not include the image of interest, within the rectangular area generated by the rectangular area generating means, to generate a rectangular image. The image feature data generating means generates feature data for the generated rectangular image.

In a second aspect of the present invention, instead of the rectangular image generating means in the first aspect, rectangular image generating means is used for converting the rectangular area generated by the rectangular area generating means and the image of interest included therein to an area and an image of determined sizes, respectively, and padding a predetermined pixel value into an area which does not include pixels associated with the image of the determined size within the area of the determined size to generate a rectangular image.

Image feature data can be generated from an image having an arbitrary shape by drawing a rectangular area around an image having the arbitrary shape such that the rectangular area contains the image, and padding a predetermined pixel value into pixels other than those pixels which belong to the original image. Also, the generated image feature data can be used to determine similarities of respective images to retrieve images similar to a specified image.

BEST MODE FOR CARRYING OUT THE INVENTION

First Embodiment

Figure 2:
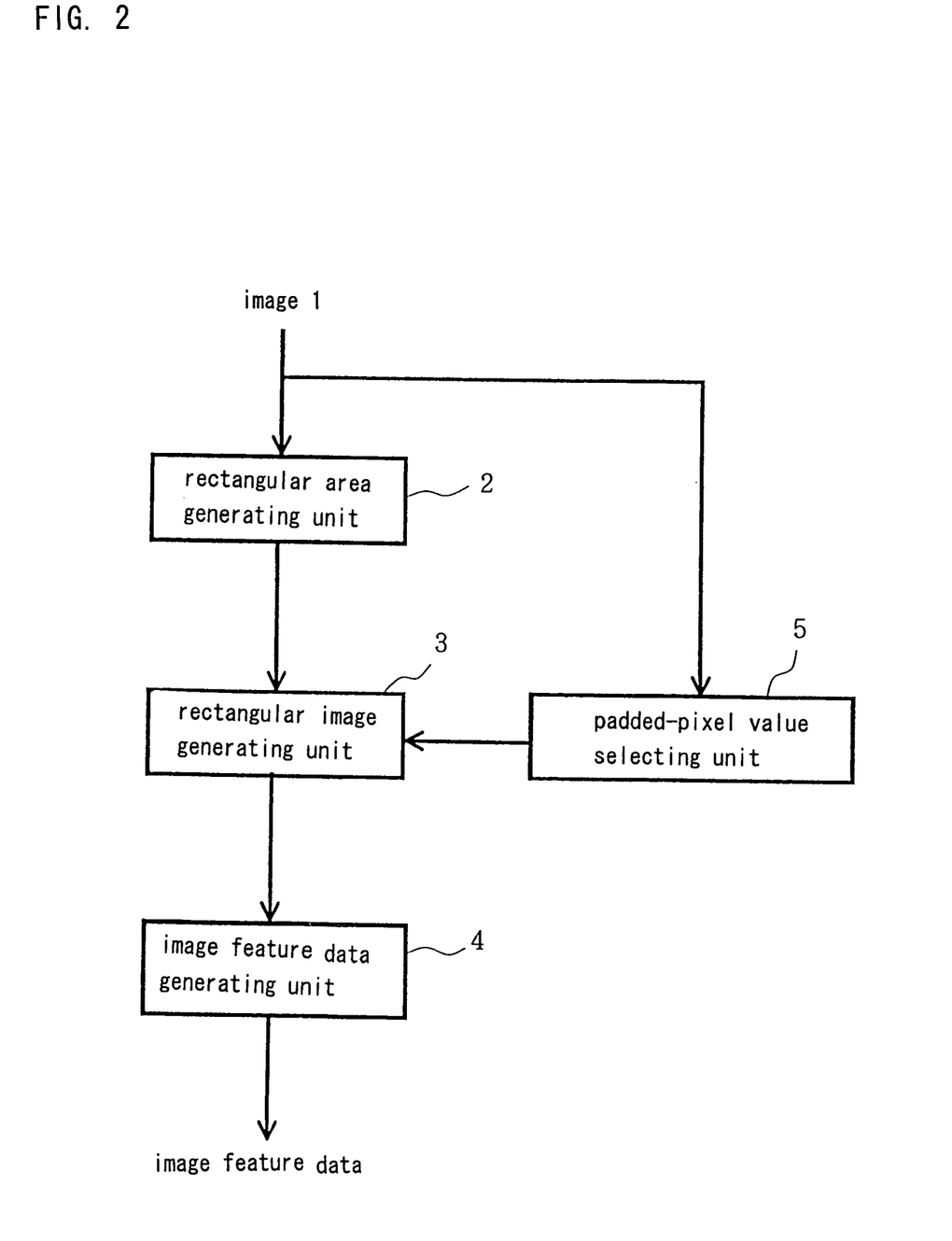
FIG. 2 is a block diagram of an image feature data generating apparatus-according to a first embodiment of the present invention.

Referring to FIG. 2, an image feature data generating apparatus according to a first embodiment of the present invention comprises rectangular area generating unit 2; rectangular image generating unit 3; image feature data generating unit 4; and padded-pixel value selecting unit 5.

Rectangular area generating unit 2 draws a rectangular area around image 1 for which feature data should be generated, such that image 1 is included therein. Preferably, the rectangular area is generated such that each side of the rectangular area adjoins at least one point of image 1.

Rectangular image generating unit 3 pads a predetermined pixel value in an area, which does not include pixels of image 1, within the rectangular area generated by rectangular area generating unit 2 to generate a rectangular image which contains image 1. The padded pixel value may be previously determined or may be selected by padded-pixel value selecting unit 5 for utilization. Padded-pixel value selecting unit 5 selects a representative color which represents an image from image 1. Although the padded pixel value may be selected by a variety of methods, suffice it to introduce four representative methods below.

A first method selects an average value of pixels included in image 1. By padding the average value, variations in DC component can be limited when frequency distribution feature data, for example, is generated as image feature data. A second method selects a color which represents an image from image 1, and pads the representative color as the pixel value. The representative color can be calculated by a method of outputting the most predominant color, most frequent color or median value, or the like. A third method pads a color largely different from the representative color or average color in order to highlight the shape feature possessed by an image. A fourth, method pads the same pixel value (for example, a pixel value which represents gray) irrespective of image 1.

Image feature data generating unit 4 extracts image feature data from the image generated by rectangular image generating unit 3.

Figure 3:
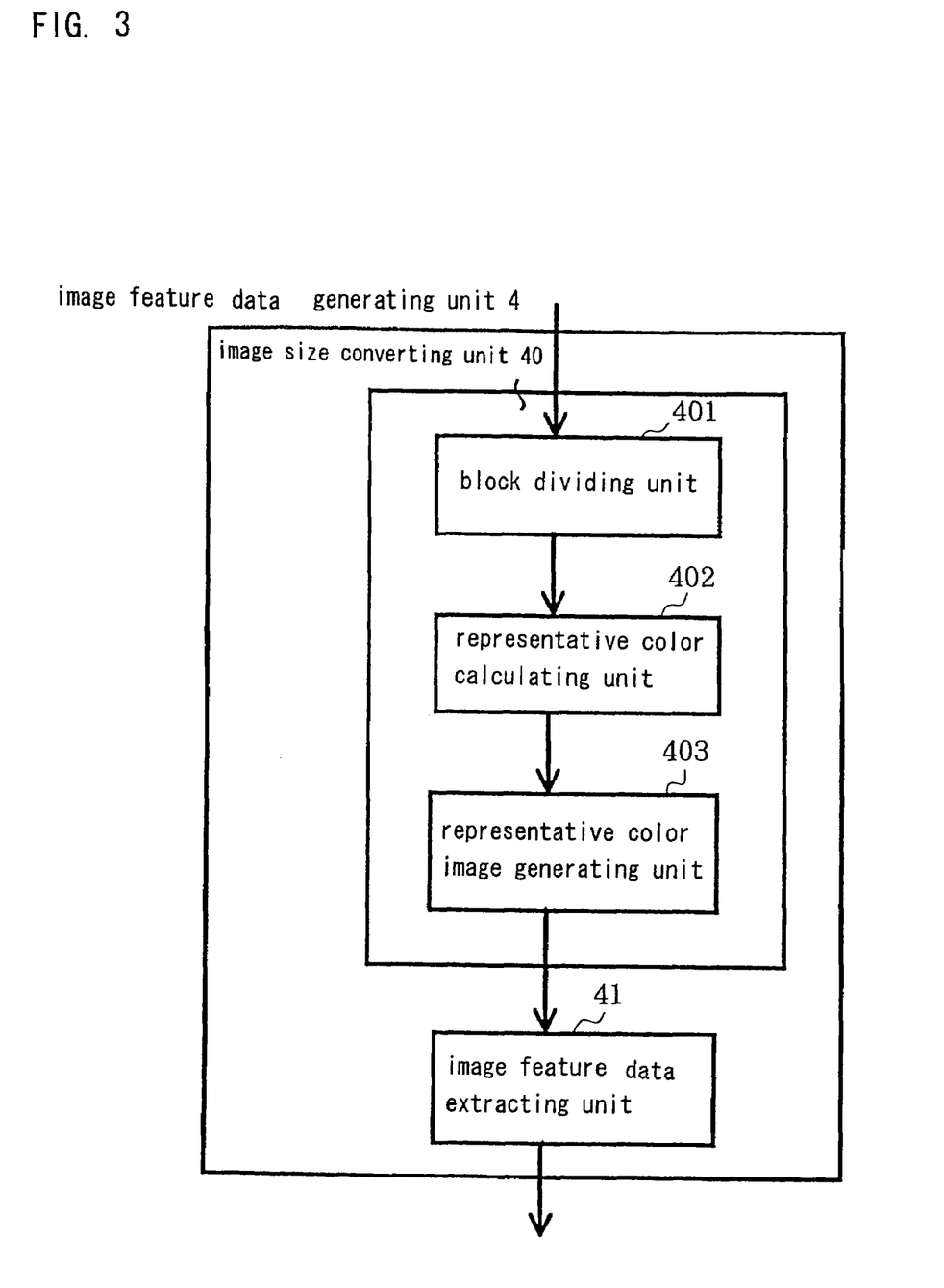
FIG. 3 is a block diagram of an image feature data generating unit in FIG. 2.

Referring to FIG. 3, image feature data generating unit 4 includes image size converting unit 40 and image feature data extracting unit 41. Image size converting unit 40 comprises block dividing unit 401; representative color calculating unit 402; and representative color image generating unit 403.

Block dividing unit 401 divides a rectangular image generated by rectangular image generating unit 3 into a predetermined number of blocks. The rectangular image is divided into blocks such that it is converted to a desired image size. For example, for generating an image of 8 pixels by 8 pixels, a rectangular image generated by rectangular image generating unit 3 is divided into 64 blocks (8 blocks vertically×8 blocks horizontally).

Representative color calculating unit 402 calculates a color representative of each of blocks generated by block dividing unit 401. The representative color may be calculated by a method of outputting the most predominant color, most frequent color or median value, or the like. Alternatively, an average value of pixels included in each block may be utilized.

Representative color image generating unit 403 generates a representative color image which has pixels in representative colors in the respective blocks calculated by representative color calculating unit 402.

Alternatively, image size converting unit 40 can scale up or down a rectangular image generated by rectangular image generating unit 3 to an image of predetermined size using a filter or the like, other than the division of the rectangular image generated by rectangular image generating unit 3 into blocks for reducing the image.

Image feature data extracting unit 41 generates image feature data for the image generated from image size converting unit 40. The generated feature data may be, for example, color distribution feature data, frequency distribution feature data, and the like. The representative color image generated by representative color image generating unit 403 may be utilized as the color distribution feature data. The frequency distribution feature data of an image refers to feature data representative of a frequency distribution of the image. An exemplary frequency distribution feature data may be comprised of values (part or all of coefficients) indicative of the energy in a plurality of bands divided from a frequency distribution of the spectrum of colors in an image converted to a fixed size, where the values are derived by analyzing the respective bands, using an orthogonal matrix such as discrete cosine transform (DCT) or the like. In addition, the frequency distribution feature data may be quantized before it is saved.

The image feature data calculated by the foregoing procedure can be used to determine similarities of respective images to retrieve images similar to a specified image.

Second Embodiment

Figure 4:
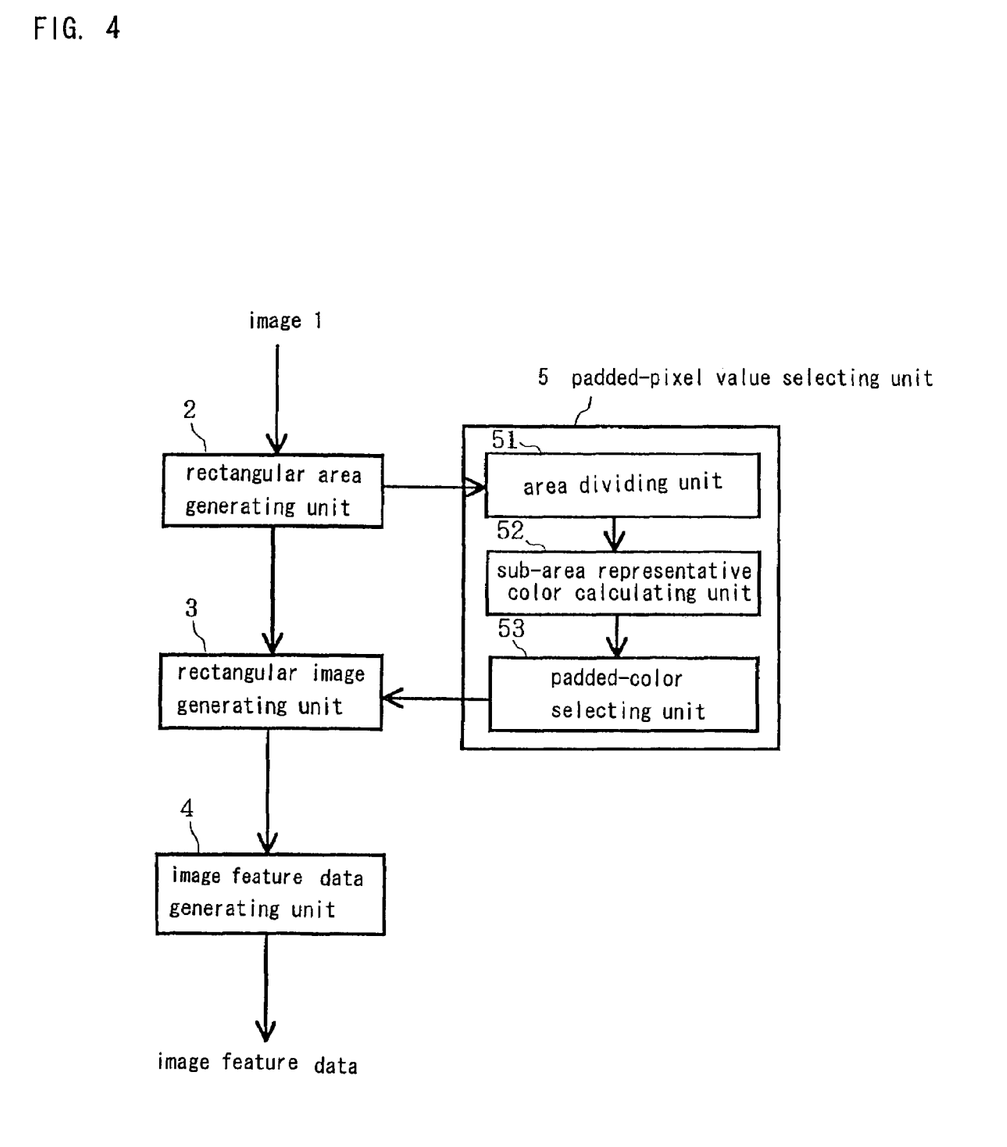
FIG. 4 is a block diagram of an image feature data generating apparatus according to a second embodiment of the present invention.

Referring to FIG. 4, an image feature data generating apparatus according to a second embodiment of the present invention comprises rectangular area generating unit 2; rectangular image generating unit 3; image feature data generating unit 4; and padded-pixel value selecting unit 5. Padded-pixel selecting unit 5 comprises area dividing unit 51; sub-area representative color calculating unit 52; -and padded-color selecting unit 53.

The image feature data generating apparatus according to the second embodiment illustrated in FIG. 4 differs from the image feature data generating apparatus according to the first embodiment illustrated in FIG. 2 in that padded-pixel value selecting unit 5 has area dividing unit 51, sub-area representative color calculating unit 52 and padded-color selecting unit 53, and that padded-pixel value. selecting unit 5 is connected to rectangular area generating unit 2.

Now, detailed description will be made on the operation of padded-pixel value selecting unit 5.

In padded-pixel value selecting unit 5, area dividing unit 51 first divides a rectangular area generated by rectangular area generating unit 2 into sub-areas.

Sub-area representative color calculating unit 52 calculates a color representative of each of sub-areas generated by area dividing unit 51. The representative color for each sub-area is selected only for pixels associated with image 1 out of pixels in each sub-area. If the number of pixels associated with image 1 in each sub-area, or the proportion of the number of the pixels falls below a predetermined threshold, this sub-area is regarded as an invalid area into which no value is substituted.

Next, padded-color selecting unit 53 calculates one representative color from a collection of the representative colors for the respective sub-areas calculated by sub-area representative color calculating unit 52, and delivers it as a pixel value for use in padding.

The subsequent operation is similar to the first embodiment. The image feature data calculated by the foregoing procedure can be used to determine similarities of respective images to retrieve images similar to a specified image.

Third Embodiment

Figure 5:
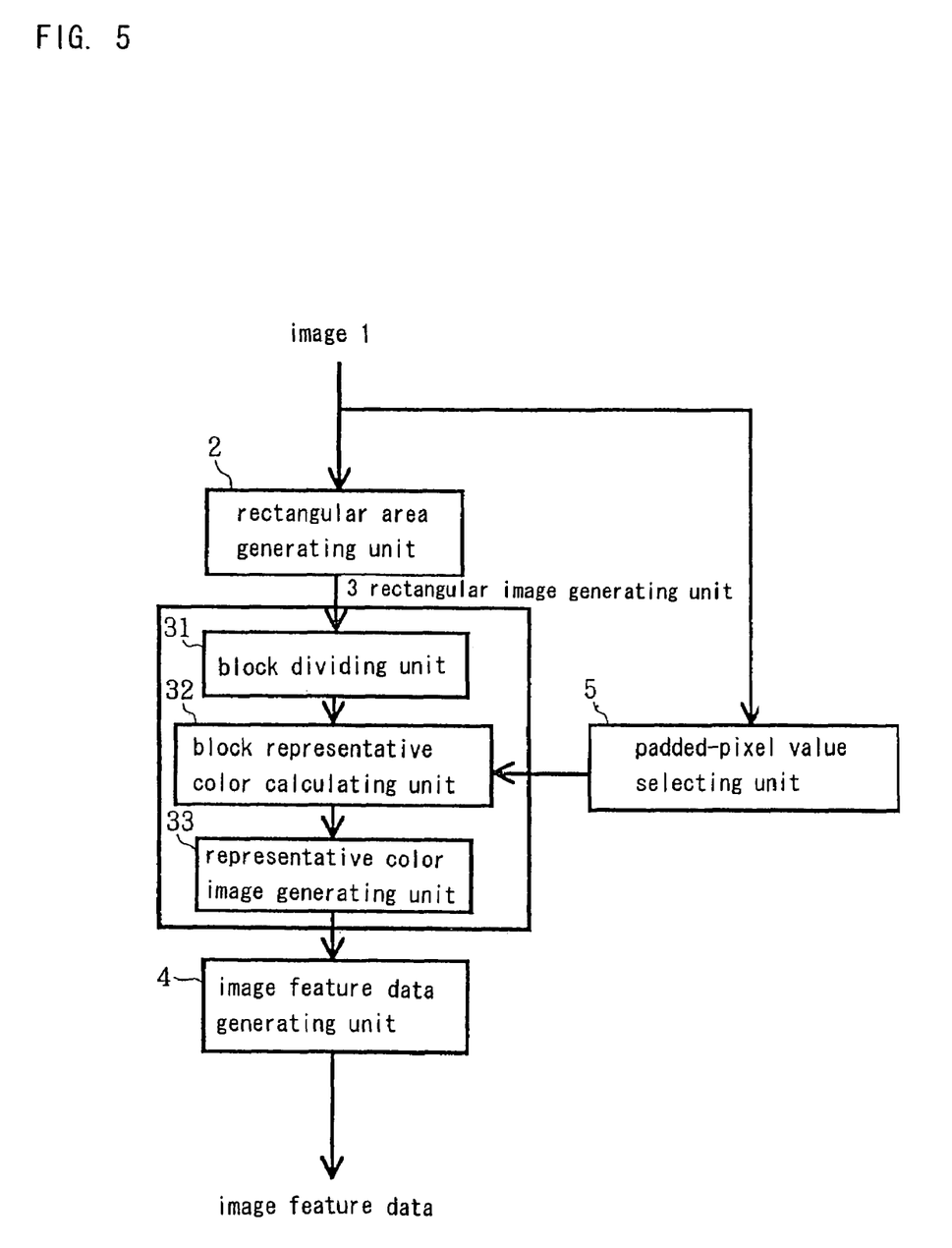
FIG. 5 is a block diagram of an image feature data generating apparatus according to a third embodiment of the present invention.

Referring to FIG. 5, an image feature data generating apparatus according to a second embodiment of the present invention comprises rectangular area generating unit 2; rectangular image generating unit 3; image feature data generating unit 4; and padded-pixel value selecting unit 5. Rectangular image generating unit 3 comprises block dividing unit 31; block representative color calculating unit 32; and representative color image generating unit 33.

First, rectangular area generating unit 2 draws a rectangular area around image 1 for which feature data should be generated, such that image 1 is included therein. Preferably, the rectangular area is generated such that each side of the rectangular area adjoins at least one point of image 1.

Rectangular image generating unit 3 converts the rectangular area defined by rectangular area generating unit 2 and the image of interest included therein to an area and an image of determined sizes, and pads a predetermined pixel value into part of the area of the determined size, which does not include pixels associated with the image of the determined size, to generate a rectangular image. The padded pixel value may be previously determined or may be selected by padded-pixel value selecting unit 5 for utilization. Specific description will be made on an exemplary operation of rectangular image generating unit 3.

Block dividing unit 31 divides a rectangular image generated by rectangular area generating unit 2 into a predetermined number of blocks. The rectangular image is divided into blocks such that it is converted to a desired image size. For example, for generating an image of 8 pixels by 8 pixels, a rectangular image generated by rectangular image generating unit 3 is divided into 64 blocks (8 blocks vertically×8 blocks horizontally).

Block representative color calculating unit 32 calculates a color representative of each of blocks generated by block dividing unit 31. A representative color for each block is selected only for pixels associated with image 1 out of pixels in each block. If the number of pixels associated with image 1 in each block, or the proportion of the number of the pixels falls below a fixed threshold, a pixel value selected by padded-pixel value selecting unit 5 is padded as a representative color for the block. On the other hand, if the number of pixels associated with image 1 in each block, or the proportion of the number of the pixels exceeds the fixed threshold, a representative color is calculated from pixels within the block. The representative color may be calculated by a method of outputting the most predominant color, most frequent color or median value, or the like. Alternatively, an average value of pixels included in each block may be utilized.

Next, representative color image generating unit 33 generates a representative color image which has pixels in representative colors in the respective blocks calculated by representative color calculating unit 32.

Padded-pixel value selecting unit 5 selects a representative color which represents an image from image 1. Although a padded pixel value may be selected by a variety of methods, four representative methods will be given below. A first method selects an average value of pixels included in image 1. By padding the average value, variations in DC component can be limited when frequency distribution feature data, for example, is generated as image feature data. A second method selects a color which represents an image from image 1, and pads the representative color as the pixel value. The representative color can be calculated by outputting the most predominant color, most frequent color, median value, or the like. A third method pads a color largely different from the representative color or average color in order to highlight the shape feature possessed by an image. A fourth method pads the same pixel value (for example, a pixel value which represents gray) irrespective of image 1.

Image feature data generating unit 4 generates image feature data for a representative color image generated by rectangular image generating unit 3. The generated feature data may be, for example, color distribution feature data, frequency distribution feature data, and the like. Here, the representative color image generated by representative color image generating unit 33 may be utilized as the color distribution feature data. The frequency distribution feature data of an image refers to feature data representative of a frequency distribution of the image. An exemplary frequency distribution feature data may be comprised of values (part or all of coefficients) indicative of the energy in a plurality of bands divided from a frequency distribution of the spectrum of colors in an image converted to a fixed size, where the values are derived by analyzing the respective bands, using an orthogonal matrix such as discrete cosine transform (DCT) or the like. Also, the frequency distribution feature data may be-quantized before it is saved.

The image feature data calculated by the foregoing procedure can be used to determine, similarities of respective images to retrieve images similar to a specified image.

Fourth Embodiment

Figure 6:
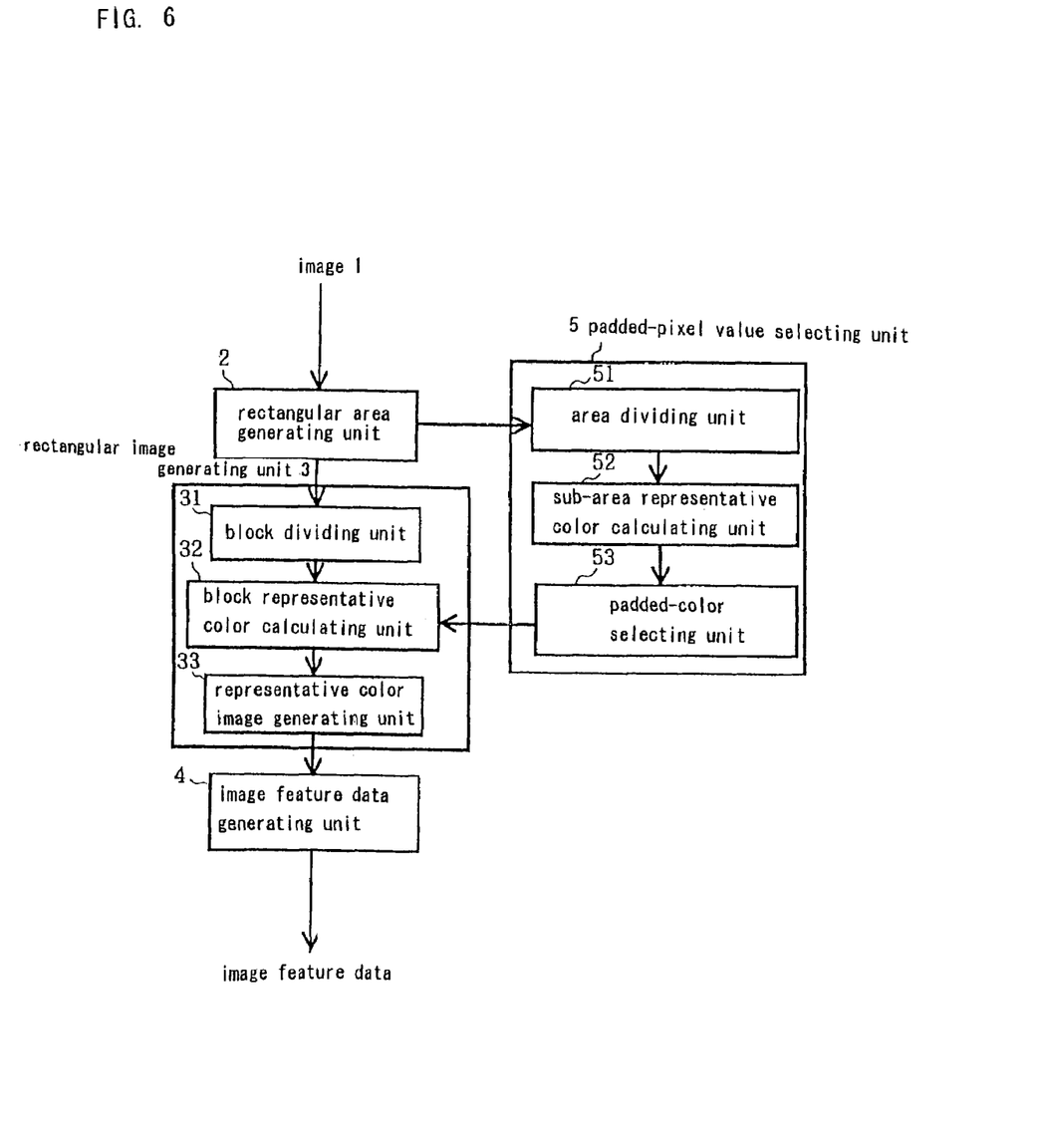
FIG. 6 is a block diagram of an image feature data generating apparatus according to a fourth embodiment of the present invention.

Referring to FIG. 6, an image feature data generating apparatus according to a fourth embodiment of the present invention comprises rectangular area generating unit 2; rectangular image generating unit 3; image feature data generating unit 4; and padded-pixel value selecting unit 5. Rectangular image generating unit 3 in turn comprises block dividing unit 31; block representative color calculating unit 32; and representative color image generating unit 33. Further, padded-pixel value selecting unit 5 comprises area dividing unit 51; sub-area representative color calculating unit 52; and padded-color selecting unit 53.

The image feature data generating apparatus in the embodiment illustrated in FIG. 6 differs from the image feature data generating unit according to the third embodiment illustrated in FIG. 5 in that padded-pixel value selecting unit 5 has area dividing unit 51, sub-area representative color calculating unit 52, and padded-color selecting unit 53. Since this padded-pixel value selecting unit 5 operates in a similar manner to padded-pixel value selecting unit 5 illustrated in the second embodiment, description thereon is omitted. The image feature data calculated by the foregoing procedure can be used to determine similarities of respective images to retrieve images similar to a specified image.

Figure 7:
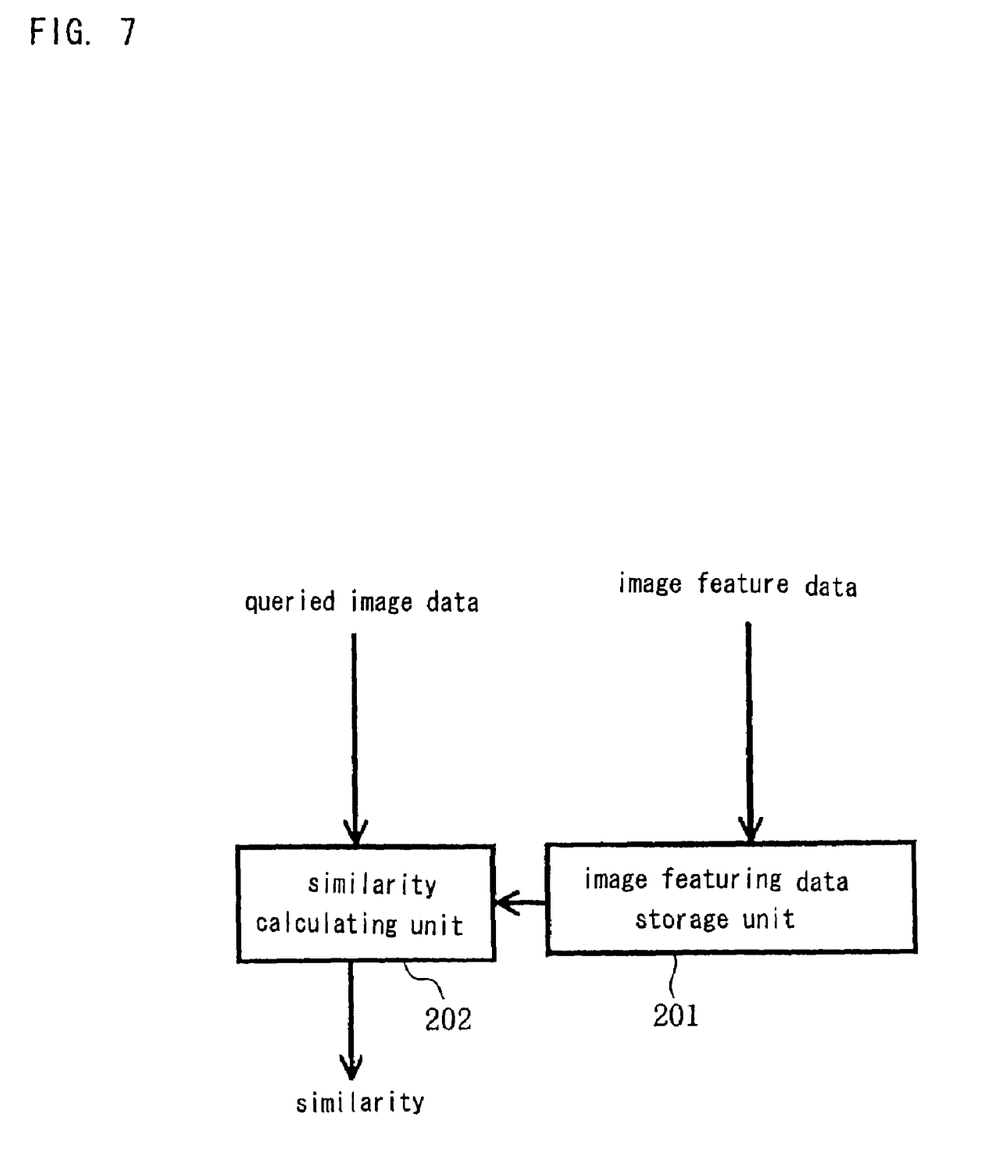
FIG. 7 is a block diagram illustrating the configuration of a main portion of an image search system according to one embodiment of the present invention.

FIG. 7 is a block diagram illustrating the configuration of an image search system according to one embodiment of the present invention. The image search system in this embodiment comprises image feature data storage unit 201 and similarity calculating unit 202.

Image feature data storage unit 201 previously stores therein image feature data extracted from image data. The image feature data used herein are image feature data generated by any of the image feature data generating apparatuses according to the first to fourth embodiments illustrated in FIGS. 2 to 6. Similarity calculating unit 202 calculates the similarity of image feature data for queried image data to image feature data in pixel feature data storage unit 20. The image feature data for the queried image data can also be generated by any of the image feature data generating apparatuses according to the first to fourth embodiments illustrated in FIGS. 2 to 6. Through the foregoing procedure, similarities can be determined for individual images to retrieve images similar to a specified image.

Other than an implementation by dedicated hardware, the image feature data generation processing illustrated in the foregoing embodiments may be executed by a program for implementing the function, which is recorded on a computer readable recording medium. The program recorded on the recording medium is read into a computer system for execution. The computer readable recording medium refers to a recording medium such as a floppy disk, a magneto-optical disk, CD-ROM or the like, or a storage device such as a hard disk drive contained in the computer system or the like. Further, the computer readable recording medium includes one for dynamically holding the program for a short period of time (transmission medium or a transmission wave), as is the case with the transmission of the program through the Internet, and one for holding the program for a fixed period of time such as a volatile memory within the computer system which functions as a server in this event.

The invention claimed is:

1. An apparatus for generating image feature data from an image of interest for which the image feature data is generated, said apparatus comprising:
   rectangular area generating means for generating a rectangular area which contains said image of interest, each side of said rectangular area adjoining at least one point of said image of interest;
   rectangular image generating means for padding an average color of said image of interest into an area which does not include said image of interest, said area being within the rectangular area generated by said rectangular area generating means, to generate a rectangular image; and
   image feature data generating means for generating frequency-domain feature data for the rectangular image generated by said rectangular image generating means.

2. The apparatus according to claim 1, wherein said image feature data generating means includes image size converting means for scaling up or down the image generated by said rectangular image generating means to an image of a determined size, said characteristic amount being generated from the image generated by said image conversion size means.

3. The apparatus according to claim 2, wherein said image size converting means includes:
   block dividing means for dividing the image generated by said rectangular image generating means into blocks;
   block representative color calculating means for calculating a representative color for each of the blocks generated by said block dividing means; and
   block representative color image generating means for generating an image composed of pixels in the representative colors calculated for the respective blocks.

4. The apparatus according to claim 3, wherein said block dividing means divides the image generated by said rectangular image generating means into 64 blocks.

5. The apparatus according to claim 1, wherein said image feature data generating means performs a frequency analysis on the image generated by said rectangular image generating means or said image size converting means to use part or all of resulting coefficients as the image feature data.

6. The apparatus according to claim 1, wherein said image feature data generating means performs a frequency analysis on the image generated by said rectangular image generating means or said image size converting means, quantizes part or all of resulting coefficients, and uses the quantized coefficients as the image feature data.

7. An apparatus for generating image feature data from an image of interest for which the image feature data is generated, said apparatus comprising:
   rectangular area generating means for generating a rectangular area which contains said image of interest, each side of said rectangular area adjoining at least one point of said image of interest;
   rectangular image generating means for converting the rectangular area generated by said rectangular area generating means and the image of interest included therein to an area and an image of determined sizes, respectively, and padding an average color of said image of interest into an area which does not include pixels associated with the image of the determined size within said area of the determined size to generate a rectangular image; and
   image feature data generating means for generating frequency-domain feature data for the image generated by said rectangular image generating means.

8. The apparatus according to claim 7, wherein said rectangular image generating means includes:
   block dividing means for dividing the image generated by said rectangular image generating means into blocks;
   block representative color calculating means for calculating a representative color for each of the blocks generated by said block dividing means; and
   block representative color image generating means for generating an image composed of pixels in the representative colors calculated for the respective blocks.

9. The apparatus according to claim 8, wherein said block dividing means divides the image generated by said rectangular image generating means into 64 blocks.

10. The apparatus according to claim 8, wherein said block representative color calculating means pads a pixel value selected by said padded-pixel selecting means for selecting a pixel value for padding into an area which does not include said image of interest, as a representative color for a block which includes the number of pixels associated with said image of interest equal to or less than a predetermined threshold out of the blocks generated by said area dividing means.

11. The apparatus according to claim 10, wherein said block representative color calculating means calculates a representative color for a block which includes the number of pixels associated with said image of interest equal to or more than the predetermined threshold only from the pixels associated with said image of interest included in said block, out of the blocks generated by said area dividing means.

12. The apparatus according to claim 7, wherein said image feature data generating means performs a frequency analysis on the image generated by said rectangular image generating means to use part or all of resulting coefficients as the image feature data.

13. The apparatus according to claim 7, wherein said image feature data generating means performs a frequency analysis on the image generated by said rectangular image generating means, quantizes part or all of resulting coefficients, and uses the quantized coefficients as the image feature data.

14. A tangible computer readable storage medium embodying a set of instructions executable by a computer for generating image feature data from an image of interest for which the image feature data is generated, said instructions comprising:

a first instruction set for generating a rectangular area which contains said image of interest, each side of said rectangular area adjoining at least one point of said image of interest;

a second instruction set for padding an average color of said image of interest into an area which does not include said image of interest, said area being within the rectangular area generated by said first instruction set, to generate a rectangular image; and a third instruction set for generating frequency-domain feature data for the rectangular image generated by said second instruction set.

15. A computer readable storage medium embodying a set of instructions executable by a computer for generating image feature data from an image of interest for which the image feature data is generated, said instructions comprising:

a first instruction set for generating a rectangular area which contains said image of interest, each side of said rectangular area adjoining at least one point of said image of interest;

a second instruction set for converting the rectangular area generated by said first instruction set and the image of interest included therein to an area and an image of determined sizes, respectively, and padding an average color of said image of interest into an area which does not include pixels associated with the image of the determined size within said area of the determined size to generate a rectangular image; and a third instruction set for generating frequency-domain feature data for the image generated by said second instruction set.

16. An apparatus for generating image feature data from an image of interest for which the image feature data is generated, said apparatus comprising:

rectangular area generating means for generating a rectangular area which contains said image of interest, each side of said rectangular area adjoining at least one point of said image of interest;

rectangular image generating means for dividing an image within the rectangular area generated by said rectangular area generating means into N blocks, finding a representative value for a block which includes a predetermined number or more of pixels that belong to said image of interest, and using an average color of said image of interest as a representative value for a block which does not include the predetermined number or more of pixels that belong to said image of interest, to generate a representative image comprised of N pixels; and image feature data generating means for generating frequency-domain feature data for said representative image.

17. An apparatus for generating image feature data from an image of interest for which the image feature data is generated, said apparatus comprising:

rectangular area generating means for generating a rectangular area which contains said image of interest, each side of said rectangular area adjoining at least one point of said image of interest;

rectangular image generating means for dividing an image within the rectangular area generated by said rectangular area generating means into N blocks, finding a representative value for a block which includes a predetermined number or more of data that belong to said image of interest, and using an average color value of all the representative color values for blocks which include the predetermined number or more of data that belong to said image of interest as a representative color value for a block which does not include the predetermined number or more of data that belong to said image of interest, to generate a representative image comprised of N pixels; and image feature data generating means for generating frequency-domain feature data for said representative image.

18. The image feature data generating apparatus according to any of claims 16 and 17, wherein the representative value for the block which includes the predetermined number or more of data that belong to said image of interest is calculated by averaging pixels belonging to said image of interest included in said block.

* * * * *